(12) United States Patent
Lehning

(10) Patent No.: US 8,340,356 B2
(45) Date of Patent: Dec. 25, 2012

(54) METHOD FOR PRODUCING A KNOWN FIXED SPATIAL RELATIONSHIP BETWEEN A LASER SCANNER AND A DIGITAL CAMERA FOR TRAFFIC MONITORING

(75) Inventor: Michael Lehning, Hildesheim (DE)

(73) Assignee: JENOPTIK Robot GmbH, Monheim (DE)

( * ) Notice: Subject to any disclaimer, the term of this patent is extended or adjusted under 35 U.S.C. 154(b) by 373 days.

(21) Appl. No.: 12/730,408

(22) Filed: Mar. 24, 2010

(65) Prior Publication Data

US 2010/0246897 A1 Sep. 30, 2010

(30) Foreign Application Priority Data

Mar. 24, 2009 (DE) .......................... 10 2009 013 667

(51) Int. Cl.
*G06K 9/00* (2006.01)
*G01P 3/36* (2006.01)
(52) U.S. Cl. .......................................... 382/106; 356/27
(58) Field of Classification Search .................. 382/103, 382/104, 107, 236; 348/67, 99, 106, 169, 348/170; 356/27, 482, 302, 404, 918, 919; 359/27, 202.1, 719, 17

See application file for complete search history.

(56) References Cited

U.S. PATENT DOCUMENTS

| 7,616,293 B2 * | 11/2009 | Sirota et al. ...................... 356/28 |
| 7,684,590 B2 * | 3/2010 | Kampchen et al. ............ 382/103 |
| 2006/0290920 A1 * | 12/2006 | Kampchen et al. ....... 356/139.04 |

FOREIGN PATENT DOCUMENTS

| DE | 195 18 978 A1 | 11/1995 |
| DE | 197 57 840 C1 | 9/1999 |
| DE | 101 54 861 A1 | 5/2003 |

* cited by examiner

*Primary Examiner* — Abolfazl Tabatabai
(74) *Attorney, Agent, or Firm* — Duane Morris LLP

(57) ABSTRACT

Method for producing a known fixed spatial relationship between a laser scanner and a digital camera for monitoring traffic, wherein the laser scanner axis and the optical axis of the digital camera are aligned relative to one another only roughly, and the spatial relationship between a scanner coordinate system (1) defined by the position of the laser scanner and orientation of the laser scanner axis and a camera coordinate system (3) defined by the position of the digital camera and orientation of the optical axis of the digital camera is calculated computationally based on the measured values and the image of a vehicle driving through the monitoring area.

7 Claims, 5 Drawing Sheets

$$\Downarrow \vec{Y} + \vec{X}$$

METHOD FOR PRODUCING A KNOWN FIXED SPATIAL RELATIONSHIP BETWEEN A LASER SCANNER AND A DIGITAL CAMERA FOR TRAFFIC MONITORING

FIELD OF THE INVENTION

Methods and devices by which an area of a roadway is monitored for an event by means of a laser scanner and a photographic recording is made by means of a digital camera in case the event occurs are known particularly from traffic measurement technology. For example, the event may be a vehicle driving through the monitored area at a speed in excess of a given speed limit. The event could also be a vehicle driving in a lane prohibited to the type of vehicle in question or a vehicle driving in the monitored area within an impermissible time window, e.g., during a red light.

BACKGROUND OF THE INVENTION

In order for such devices to be authorized for use in accordance with regulations, it must be ensured and plausibly established that the values measured by the laser scanner are correct on the one hand and, on the other hand, the measured values must be able to be assigned unequivocally to the appropriate vehicle.

DE 10 2009 007 055.9 is directed to a method which solves the problem of unequivocal association, in particular the association of a measured speed of a vehicle with a vehicle pictured in a graphic document.

In a method according to DE 10 2009 007 055.9, a measuring beam is scanned horizontally over a roadway over a given measurement angle area so that vehicles traveling through the resulting scan plane generate measured values from which the speed of the vehicles and the change in position over time can be determined.

The measuring beam is a pulsed laser beam which repeatedly scans the horizontal scan plane at a constant, predetermined scanning frequency and a constant, predetermined pulse frequency. For this purpose, a laser scanner is arranged next to the roadway at an acute angle to the direction of the roadway.

During the scan, the laser beam impinges on vehicles located within the measurement angle area and is reflected. The respective point of impingement is described by a measurement point $P_n$.

The transit time of the pulsed laser beam (pulse travel time) to and from the appropriate vehicle correlates to the distance traveled, from which the distance $e_n$ of a measurement point $P_n$ from the laser scanner positioned at the edge of the roadway can be derived and associated with a time $t_n$, and an instantaneous scanning angle $\epsilon_n$.

Using the measured values for the distance $e_n$, the instantaneous scanning angle $\epsilon_n$ and the time $t_n$, the measurement points $P_n$ can be described with a temporal correlation in a polar coordinate system (scanner coordinate system) which is determined by the position and orientation of the laser scanner.

After the speed of the appropriate vehicle has been determined from the measured values, this speed is compared to a given speed limit and, if this speed limit is exceeded, a digital camera is triggered to make an electronic recording as soon as this vehicle is located at a predetermined distance—the photo distance $e_{foto}$—from the digital camera. The electronic recording is stored so that photographic evidence can be printed out at any time.

The digital camera is connected to the laser scanner by a controlling and evaluating unit and is basically oriented and adjusted in relation to the laser scanner and roadway such that it images an object field with a width of the angular area in-focus at the photo distance $e_{foto}$.

A marker is generated from the measured values to visibly mark the appropriate vehicle as such in the photographic evidence. To this end, the measured values obtained within the scan closest in time to the triggering time of the digital camera are stored. The measured values of the scan during which the photo distance $e_{foto}$ was also established are advantageously stored.

The measured values of a scan consist of many pairs of measured values from an instantaneous scanning angle $\epsilon_n$ and a distance $e_n$, each representing a measurement point $P_n$. At a constant scanning frequency and a given pulse frequency, the vehicle surface or, more exactly, the front of the vehicle and a side of the vehicle as they are "seen" by the scanner causes, along a line in the scan plane, a finite quantity of measured value pairs which describe an angle-forming pair of lengths.

All of the measured value pairs which, taken together, describe an angle-forming length pair (hereinafter referred to as object angle) form a group that is generated in each instance by a vehicle. It will be clear to the person skilled in the art that the measurement points $P_n$ determined by the measured value pairs lie only approximately on a straight line in practice, and the object angle is placed in the group of measured value pairs by means of mathematical approximation methods.

According to DE 10 2009 007 055.9, a marker is generated from the group of measured value pairs and is superimposed on the photographic recording so as to form a picture in which a marker occurs on the appropriate vehicle along the measurement points along the width and/or length of the imaged vehicle, preferably at the height of the scan plane.

Since the marker is formed on the basis of the measured value pairs of the scan which is carried out immediately upon establishing the photo distance $e_{foto}$, it can be safely assumed that the vehicle whose position is at the photo distance $e_{foto}$ at the moment that the digital camera is triggered is in fact the appropriate vehicle.

In order to generate this marker, the group of measured value pairs representing measurement points $P_n$ at the vehicle in the horizontal scan plane is transformed into a group of image points which represent correlating points in the image of the vehicle which is photographed in perspective, i.e., in the recording. A digitized marker containing the image points is then formed from the group of image points.

The electronically acquired image data of the vehicle which are obtained with the recording can be stored as a digitized recording in a file together with the digitized marker so that the marker is visibly superimposed on the appropriate vehicle when the file is graphically rendered.

However, it is more advantageous to store the digitized recording and the digitized marker in separate files which are, however, linked. For graphic rendering, the files are superimposed so that, in this case also, the marker is visibly superimposed on the appropriate vehicle. When stored separately, the digitized image of the vehicle, particularly of the license plate, remains unaffected and with its information fully intact.

The marker is then only temporarily superimposed on the recording of the vehicle for viewing the recording on a screen or for printing out a photograph.

By transforming the group of measured value pairs into a group of image points, a marker can be generated which is superimposed on the image of the vehicle so as to exactly cover the measurement points $P_n$ which were correct immediately upon the triggering of the digital camera. This means that the marker is formed on the imaged vehicle along the points of impingement.

The marker advantageously covers all of these measurement points $P_n$ and extends as a line completely along the length and width of the visible sides of the imaged vehicle.

However, it can also cover only some of the measurement points $P_n$ and then advantageously forms a line extending only along the visible side on which the license number is not located so as to safely avoid affecting the image of the license number.

The certainty that the marked vehicle is also the appropriate vehicle is provided in that the measurement data used for marking the vehicle are brought about by the vehicle itself at the moment that an electronic recording of the appropriate vehicle is made.

In the method described in DE 10 2009 007 055.9, it is implied that the correlation between the scanner coordinate system and the camera coordinate system is known in order to allow the measurement data of the laser scanner system to be associated exactly with the image points in the recording of the digital camera which represent an image of the object points which are described as measurement points (points of impingement) by the measurement data. In other words, a marker generated from the measurement data can only be correctly transformed into the image when the spatial relationship between the two coordinate systems is known.

The object of the method according to the invention is to produce a spatial relationship of this kind.

A laser scanner and a digital camera which are to function jointly in an apparatus in coordination with one another are usually adjusted relative to one another when the apparatus is assembled by the manufacturer. To this end, the axis of the laser scanner around which the laser beam is deflected at a constantly changing scanning angle and the optical axis of the digital camera are adjusted relative to one another by means of a stationary measuring body in such a way that they "see" the measuring body at the same viewing angle. Ideally, this is only the case when the two axes coincide, although this is impossible in practice. Therefore, the axes are oriented parallel to one another at the least possible, negligible axial distance with respect to the measuring distance determined by the photo point. The measured values of the individual measurement points can then be converted into a Cartesian coordinate system and transformed into the associated image points taking into account the imaging characteristic of the digital camera, particularly the focal length of the camera objective.

It is disadvantageous that the laser scanner and the digital camera must be stabilized with respect to one another as the result of alignment. In arrangements in which the laser scanner and the digital camera are to be installed separately in the field, which is particularly advantageous when a plurality of roadways are to be monitored, prior alignment is not possible.

In contrast to the method known from DE 10 2009 007 055.9, where the laser scanner scans a monitoring area horizontally, the scanner can also scan the monitoring area vertically or also at an angle of inclination between 0° and 90°, e.g., in order to acquire the vehicle profile. Particularly in the case of vertical scanning, it is clear that it is not always useful to orient the laser scanning axis and the camera axis along the same axis. In general, the digital camera should be oriented in such a way at a height above the roadway and in the direction of traffic that the vehicle driver is photographed from the front.

However, on-site alignment has proven to be extremely cumbersome and also dangerous under certain circumstances, particularly when the equipment is installed, for example, at the edge of the road in moving traffic and the laser scanner and digital camera are not installed at the same location, e.g., when the laser scanner is installed to the side at the edge of the road and the digital camera is mounted on a bridge.

SUMMARY OF THE INVENTION

It is the object of the invention to find a method for producing a known fixed spatial relationship between a laser scanner and a digital camera of a traffic monitoring device at the place of use.

BRIEF DESCRIPTION OF THE DRAWINGS

The method according to the invention will be described more fully in the following with reference to an embodiment example shown in the drawings. The drawings show.

DESCRIPTION OF AN EMBODIMENT OF THE INVENTION

Figure 1A:
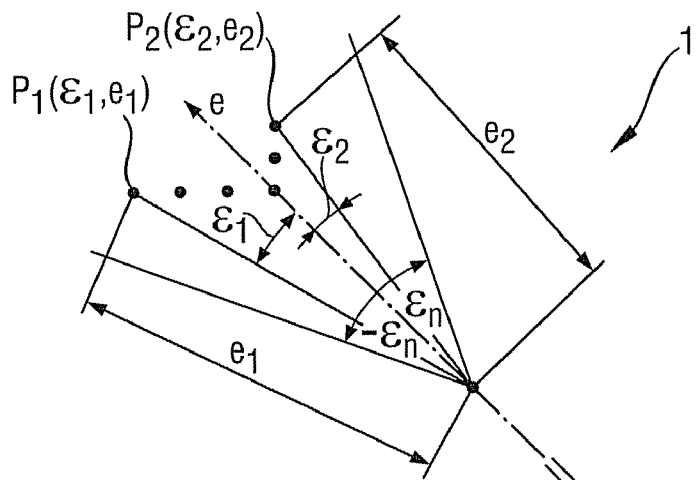
FIG. 1a is a measurement structure in the scanner coordinate system.

In order to carry out the method, a laser scanner with a laser scanner axis around which the laser beam is deflected at a constantly changing scanning angle and a digital camera with an optical axis around which the digital camera and, therefore, its image plane can be rotated in any desired manner are aligned relative to one another in such a way that the monitoring area defined by the scanning angle area is completely covered by the object field of the digital camera at a given photo point.

The laser scanner is advantageously arranged next to the roadway in order to scan the monitoring area in a horizontal plane or is mounted above the roadway to scan a vertical plane. Other arrangements of the laser scanner are also possible, e.g., in order to scan the monitoring area in an oblique plane.

With respect to the acquisition of the measured values, the difference consists in that the position of the vehicle is completely acquired with basically one scan in horizontal scanning, whereas in vertical scanning, depending on the speed of the vehicle, a plurality of scans must be carried out in order to acquire the complete volume model of the vehicle.

In horizontal scanning, the measured values formed by measurement points in only one plane ideally present a line in the shape of an angle whose leg position changes when the vehicle is acquired through a plurality of scans. The angle is a measurement structure recognizable on the vehicle.

When scanning from an appreciably elevated scanner position, the measured values describe a surface corresponding to a projection on the vehicle. The periphery of this surface presents a rectangle in the idealized case with a vertical scanning direction, this rectangle presenting a measurement structure which is recognizable on the vehicle.

When the laser scanner axis is directed at an inclination to the roadway when scanning in a vertical plane, a lateral surface and the top surface and even the front surface are acquired when the vertical plane does not extend perpendicular to the roadway direction. The peripheries of the surfaces described by the measured values again present a recognizable measurement structure.

Measurement structures of this kind can also be obtained from the measured values of a plurality of laser scanners which, for example, acquire a vehicle in a horizontal scan plane on the one hand and in a vertical scan plane on the other hand.

After the laser scanner and the digital camera are aligned relative to one another as was described above, a vehicle traveling through the monitoring area is scanned. The laser beam is reflected by the vehicle at its points of impingement (hereinafter referred to as measurement points) so that measured values are generated. A recording is initiated when the vehicle reaches the photo point.

For each scan, the measured values are generated as a function of the pulse frequency and scan speed. These measured values are formed by a plurality of measured value pairs from a distance $e_n$ and an angle value $\epsilon_n$ and, in each instance, describe the location of a measurement point $P_n$ ($e_n$; $\epsilon_n$) within a scanner coordinate system 1.

From these measured values, those that together form a measurement structure recognizable at the vehicle are filtered out computationally.

For a simple description of an advantageous embodiment example, a laser scanner arrangement such as that described in DE 10 2009 007 055.9 will be taken as a point of departure.

A vehicle driving through the monitoring area is scanned in a horizontal plane so that approximately an angle is formed as measurement structure. The angle is formed by a line along the front of the vehicle and the side of the vehicle "seen" by the laser scanner at the height of the scan plane.

FIG. 1a shows the scanner coordinate system 1, a polar coordinate system in which five measurement points are shown by way of example.

Figure 1B:
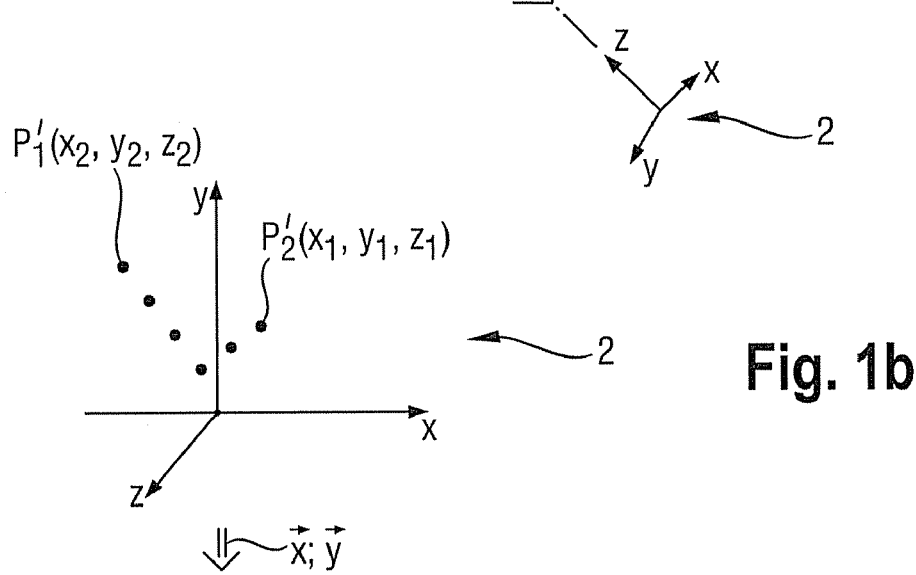
FIG. 1b is the measurement structure in the transformed coordinate system.

In a following step, the measured values of the measurement points $P_n$ of the measurement structure which are described by polar coordinates are converted into Cartesian coordinates of a Cartesian coordinate system (hereinafter referred to as transformed coordinate system 2) which can likewise be associated with the laser scanner, wherein the resulting valves for the Z axis which coincide with the laser scanner axis are zeroed. The measured values are shown in a plane (see FIG. 1b). The transformed coordinate system 2 has the same coordinate origin as the scanner coordinate system 1.

Transforming the measured values relating to the transformed coordinate system 2 into a camera coordinate system 3 defined by the digital camera basically requires translational displacements along the three coordinate axes defined by the transformed coordinate system 2 and rotational movements around these coordinate axes, as well as conversion of the measured values taking into account the known imaging characteristic of the digital camera, particularly the focal length.

Provided that there is no distortion, or only negligible distortion, of the objective of the digital camera, the scale of the axes need only be adapted to the imaging scale of the digital camera to convert the measured values.

The amounts of translational movement are at least roughly predefined. They are either known, since the laser scanner and the digital camera are located in a common housing, or are obtained by measuring the distances of the laser scanner from the digital camera along the coordinate axes of the transformed digital camera. Further, the translational position can also be obtained through mathematical curve fitting methods by bringing automated scan images in line with the associated camera images using algorithms.

Figure 1C:
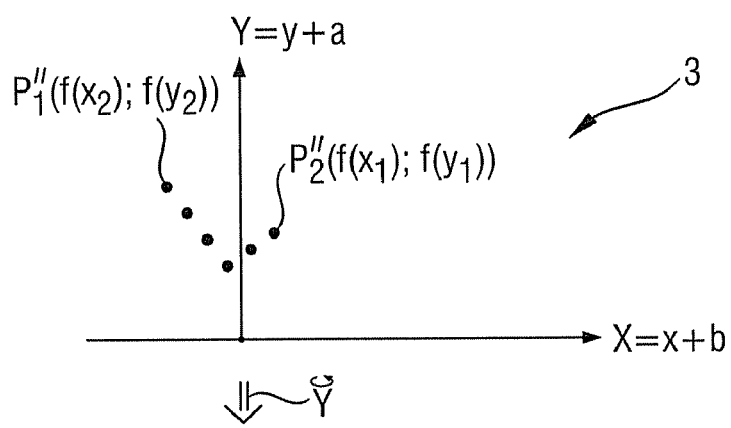
FIG. 1c is the measurement structure in the camera coordinate system.
Figure 1D:
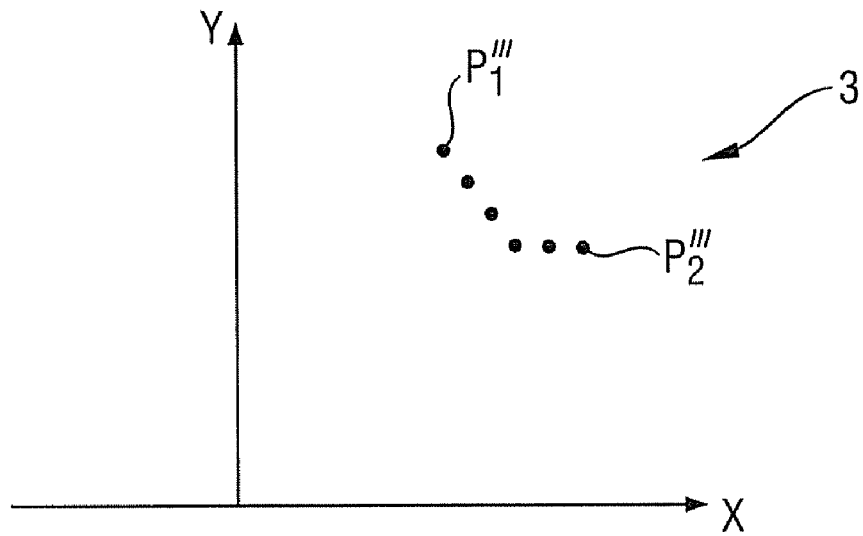
FIG. 1d is the measurement structure in the camera coordinate system after a first rotation.
Figure 1E:
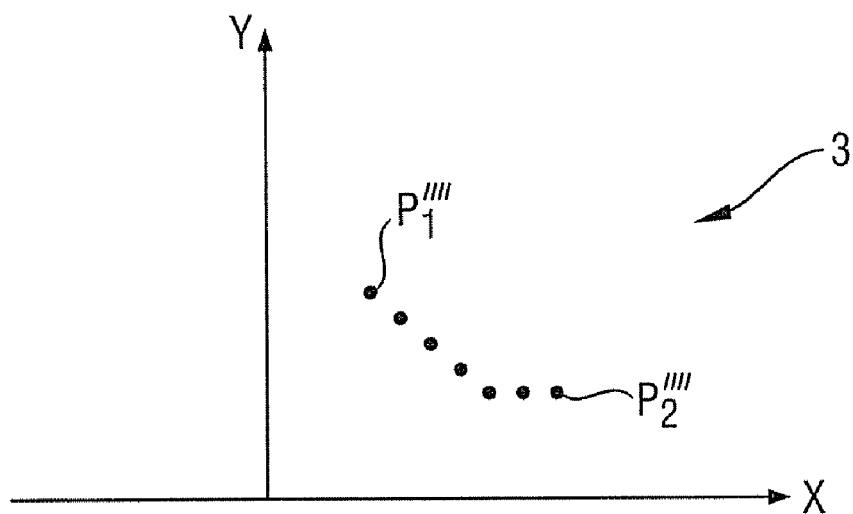
FIG. 1e is the measurement structure in the camera coordinate system after a second rotation.
Figure 2A:
FIGS. 2a, 2b are a measurement structure superimposed on a recording in a first position.
Figure 2A:
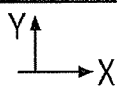
Figure 2B:
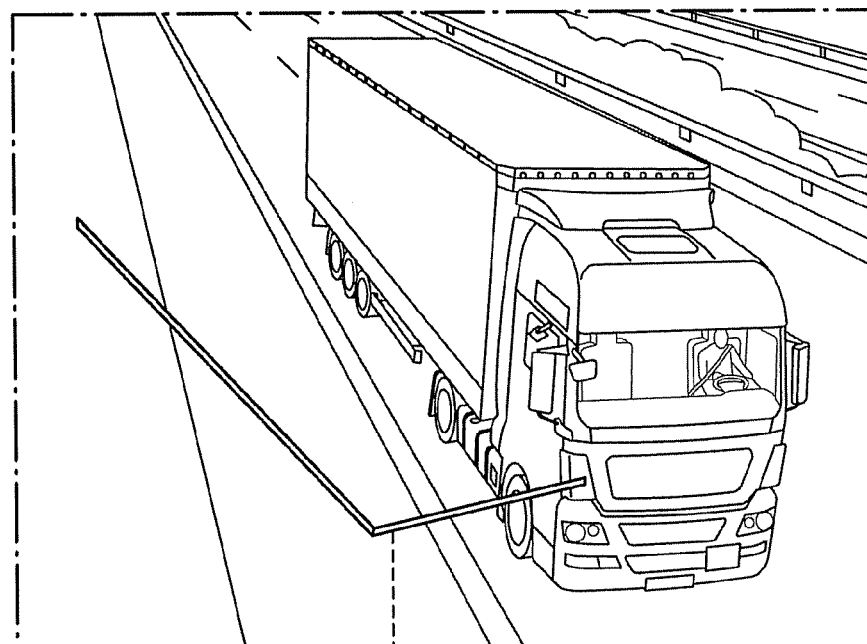
Figure 2B:
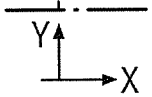

The measured values of the measurement structure are placed in the camera coordinate system 3 (FIG. 1c) computationally by translational displacement. Since the measured values related to the transformed coordinate system 2 are transformed only translationally in the camera coordinate system 3 and this only roughly, the measurement structure is not superimposed on the image of the vehicle along the measurement points at the vehicle which define the measurement structure (FIGS. 2a and 2b).

Figure 3A:
FIGS. 3a, 3b are a measurement structure superimposed on a recording in a second position.
Figure 3B:
Figure 4A:
FIGS. 4a, 4b are a measurement structure superimposed on a recording in a third position.
Figure 4B:
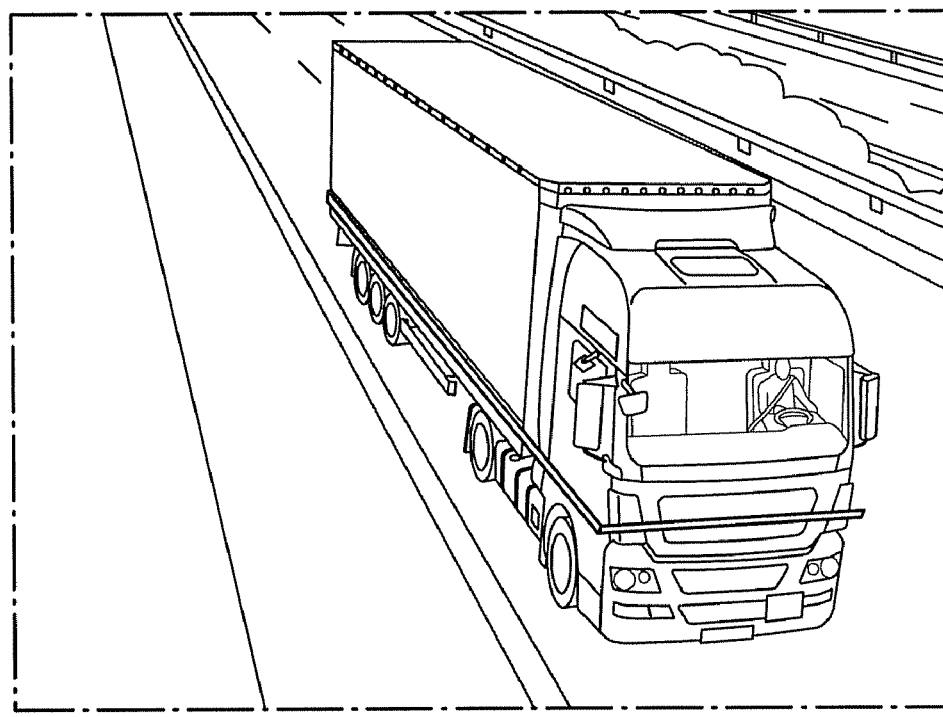

In order for the measurement structure to be exactly superimposed on the measurement points at the vehicle, it is necessary in this case, by way of example, to carry out another slight translational displacement in direction of the X axis and a rotational movement around the Y axis to arrive at an intermediate stage as is shown in FIGS. 3a and 3b; a rotational movement around the X axis and a slight translational displacement in direction of the Y axis are required in order to arrive at the final stage as is shown in FIGS. 4a and 4b.

These only slight translational displacements are necessary under some circumstances owing to imprecise measurements or because of intervening changes in the relative position of the laser scanner and digital camera caused, e.g., by transporting. Like the rotational movements, these slight translational displacements are accomplished only computationally and not by changing the relative position between the laser scanner and digital camera. For example, the rotational angle can be determined in such a way that a user changes the rotational angle by an iterative process in such a way that the image of the calculated legs, i.e., the measurement structure, is superimposed on the vehicle image in the correct position (FIG. 4a).

In practice, the translational displacements and the rotational movements are preferably carried out interactively. To this end, an input device, e.g., a joystick, mouse, keyboard, or the like, and an output device, e.g., a screen, or a combined input/output device, e.g., a device with a touch screen, are connected to the traffic monitoring device at least temporarily.

After at least one photograph has been taken with the digital camera, a measurement structure is calculated from the appropriate measured values, superimposed on the photograph of the digital camera, and displayed on the output device as a marker. In order to superimpose the marker exactly with the vehicle on the photograph, the marker is displaced and/or rotated by means of the input device until it is ideally superimposed on the vehicle. This process is preferably repeated until the marker is exactly superimposed on the imaged vehicle without further correction.

The proposed method serves for subsequent traffic monitoring to ensure on the one hand that the vehicle acquired by the laser scanner is also the imaged vehicle and, on the other hand, that the acquired vehicle can be marked by making the measurement structure identifiable by means of a marker which is superimposed on the electronic image of the vehicle. The latter is particularly advantageous when monitoring traffic on a plurality of traffic lanes on a roadway.

The method according to the invention is particularly advantageous in that, apart from the initial rough alignment of the laser scanner and digital camera, the production of a known spatial relationship between a scanner coordinate system 1 determined by the laser scanner and a camera coordinate system 3 determined by the digital camera is not carried out by changing the relative position of the laser scanner and the digital camera, but rather exclusively computationally so that the preparations for traffic monitoring in the field can be carried out faster and, above all, more safely.

The proposed method of alignment between a coordinate system of a measuring device and a camera coordinate system 3 can be used analogously for any type of measuring system in which the measuring device indicates the position of the vehicle.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for producing a known fixed spatial relationship between a laser scanner and a digital camera for traffic monitoring, comprising the steps of:
   aligning a laser scanner with a laser scanner axis and a digital camera with an optical axis relative to one another in such a way that a monitoring area defined by the scanning angle area is completely covered by the object field of the digital camera at a given photo point;
   scanning a vehicle driving through the monitoring area to obtain measured values associated with measurement points in relation to a scanner coordinate system 1 defined by the laser scanner and having polar coordinates;
   triggering a recording of the scanned vehicle by means of the digital camera when the vehicle reaches the photo point;
   generating a measurement structure by transforming a group of said measured values associated with said measurement points at the vehicle into a group of image points,
   filtering out the measured values which together form an identifiable measurement structure on the vehicle;
   transforming the measured values of the measurement structure which relate to the scanner coordinate system 1 into a transformed coordinate system with the same coordinate origin and Cartesian coordinates; and
   transforming the measured values of the measurement structure which relate to the transformed coordinate system 2 into a camera coordinate system defined by the digital camera so that the measurement structure is superimposed on the imaged measurement points of the imaged vehicle.

2. A method according to claim 1, wherein the transformation of the measured values is carried out by translational displacements along three coordinate axes defined by the transformed coordinate system and rotational movements around these coordinate axes, and by converting the measured values taking into account the known imaging characteristic of the digital camera.

3. A method according to claim 2, wherein known distance values between the laser scanner and the digital camera are used for the translational displacement.

4. A method according to claim 2, wherein the distances between the laser scanner and the digital camera are measured for the translational displacement.

5. A method for producing a known fixed spatial relationship between a laser scanner and a digital camera for traffic monitoring, comprising the steps of:
   aligning a laser scanner with a laser scanner axis and a digital camera with an optical axis relative to one another in such a way that a monitoring area defined by the scanning angle area is completely covered by the object field of the digital camera at a given photo point;
   scanning a vehicle driving through the monitoring area to obtain measured values associated with measurement points in relation to a scanner coordinate system 1 defined by the laser scanner and having polar coordinates;
   triggering a recording of the scanned vehicle by means of the digital camera when the vehicle reaches the photo point;
   filtering out the measured values which together form an identifiable measurement structure on the vehicle;
   transforming the measured values of the measurement structure which relate to the scanner coordinate system 1 into a transformed coordinate system with the same coordinate origin and Cartesian coordinates; and
   transforming the measured values of the measurement structure which relate to the transformed coordinate system 2 into a camera coordinate system defined by the digital camera so that the measurement structure is superimposed on the imaged measurement points of the imaged vehicle,
   wherein the transformation of the measured values is carried out by translational displacements along three coordinate axes defined by the transformed coordinate system and rotational movements around these coordinate axes, and by converting the measured values taking into account the known imaging characteristic of the digital camera, and
   wherein the distances between the laser scanner and the digital camera are estimated by mathematical curve fitting by comparing the data of the laser scanner to the recorded digital data of the digital camera for the translational displacement.

6. A method for producing a known fixed spatial relationship between a laser scanner and a digital camera for traffic monitoring, comprising the steps of:
   aligning a laser scanner with a laser scanner axis and a digital camera with an optical axis relative to one another in such a way that a monitoring area defined by the scanning angle area is completely covered by the object field of the digital camera at a given photo point;
   scanning a vehicle driving through the monitoring area to obtain measured values associated with measurement points in relation to a scanner coordinate system 1 defined by the laser scanner and having polar coordinates;
   triggering a recording of the scanned vehicle by means of the digital camera when the vehicle reaches the photo point;
   filtering out the measured values which together form an identifiable measurement structure on the vehicle;
   transforming the measured values of the measurement structure which relate to the scanner coordinate system 1 into a transformed coordinate system with the same coordinate origin and Cartesian coordinates; and transforming the measured values of the measurement structure which relate to the transformed coordinate system 2 into a camera coordinate system defined by the digital camera so that the measurement structure is superimposed on the imaged measurement points of the imaged vehicle, wherein the measurement structure is superimposed on the electronic image of the vehicle as a marker, and the rotational angle for the rotational movement is determined in such a way that a user changes the rotational angle by an iterative process in such a way that the marker is superimposed on the vehicle image in the correct position.

7. A method for producing a known fixed spatial relationship between a laser scanner and a digital camera for traffic monitoring, comprising the steps of:

aligning a laser scanner with a laser scanner axis and a digital camera with an optical axis relative to one another in such a way that a monitoring area defined by the scanning angle area is completely covered by the object field of the digital camera at a given photo point;

scanning a vehicle driving through the monitoring area to obtain measured values associated with measurement points in relation to a scanner coordinate system 1 defined by the laser scanner and having polar coordinates;

triggering a recording of the scanned vehicle by means of the digital camera when the vehicle reaches the photo point;

filtering out the measured values which together form an identifiable measurement structure on the vehicle;

transforming the measured values of the measurement structure which relate to the scanner coordinate system 1 into a transformed coordinate system with the same coordinate origin and Cartesian coordinates; and transforming the measured values of the measurement structure which relate to the transformed coordinate system 2 into a camera coordinate system defined by the digital camera so that the measurement structure is superimposed on the imaged measurement points of the imaged vehicle, wherein the measurement structure is superimposed on the electronic image of the vehicle as a marker, and the rotational angle for the rotational movement is determined in such a way that the marker is superimposed on the vehicle image in the correct position by mathematical curve fitting between the scanner data and the geometry information extracted from the image data.

* * * * *